United States Patent [19]

Mussini

[11] Patent Number: 5,510,054

[45] Date of Patent: Apr. 23, 1996

[54] POLYURETHANE ELASTOMER AND FOAM EXHIBITING IMPROVED ABRASION RESISTANCE

[75] Inventor: Stefano Mussini, Sassuolo, Italy

[73] Assignee: Dow Italia S.P.A., Italy

[21] Appl. No.: 496,698

[22] Filed: Jun. 29, 1995

[51] Int. Cl.$^6$ .................................................. C08G 18/32
[52] U.S. Cl. .................... 252/182.23; 252/182.24; 521/132; 521/137; 524/483; 524/507; 525/130
[58] Field of Search ........................... 521/132, 137; 525/130; 524/483, 507; 252/182.23, 182.24

[56] References Cited

U.S. PATENT DOCUMENTS

| | | |
|---|---|---|
| 3,591,532 | 7/1971 | Abercrombie et al. . |
| 3,901,959 | 8/1975 | Allport et al. . |
| 4,148,840 | 4/1979 | Shah . |
| 4,218,543 | 8/1980 | Weber et al. . |
| 4,242,468 | 12/1980 | Baack et al. . |
| 4,269,945 | 5/1981 | Vanderhider et al. . |
| 4,297,444 | 10/1981 | Gilbert et al. . |
| 4,390,645 | 6/1983 | Hoffman et al. . |
| 4,394,491 | 7/1983 | Hoffman . |
| 4,444,910 | 4/1984 | Rice et al. . |
| 4,463,107 | 7/1984 | Simtorh et al. . |
| 4,495,081 | 1/1985 | Vanderhider et al. . |
| 4,530,941 | 7/1985 | Turner et al. . |
| 4,574,137 | 3/1986 | Serratelli et al. . |
| 4,647,596 | 3/1987 | Ishii et al. . |
| 4,685,411 | 8/1987 | Wick . |
| 4,757,095 | 7/1988 | Galan et al. . |
| 5,079,270 | 1/1992 | Burkhart et al. . |
| 5,281,632 | 1/1994 | Smits ........................ 521/132 |
| 5,405,885 | 4/1995 | Sampara et al. ............... 521/132 |
| 5,451,615 | 9/1995 | Birch ........................ 521/132 |

FOREIGN PATENT DOCUMENTS 0235888  9/1987  European Pat. Off. .

*Primary Examiner*—Morton Foelak

[57] ABSTRACT

Disclosed is a polyurethane elastomer having a density of from about 100 to about 1100 kg/m$^3$, and an abrasion loss of less than about 300 mg, as determined in accordance with Test Method A of ISO 4649. Such elastomer can be prepared by reacting a urethane-modified polyisocyanate with at least one polyol in the presence of from about 0.1 to about 10 parts per 100 parts by weight of polyol' of a liquid polybutadiene comprising 1,2-butene, 2,3-(trans)butene and 2,3-(cis)butene moieties, wherein the 1,2-butene content is less than about 50 percent, based on total butene content, and the 2,3 (cis)-butene content is greater than the 2,3-(trans)butene content.

20 Claims, No Drawings

POLYURETHANE ELASTOMER AND FOAM EXHIBITING IMPROVED ABRASION RESISTANCE

BACKGROUND OF INVENTION

This invention relates to a polyurethane elastomer exhibiting an improved abrasion resistance performance, and a process for the preparation thereof requiring the use of a liquid polybutadiene.

Polyurethane elastomer may be obtained by reaction of an isocyanate compound with an active hydrogen-containing compound such as, for example, a polyester or polyether polyol and, optionally, in the presence of a blowing agent. For processing convenience advantageously, the isocyanate compound is an isocyanate-terminated prepolymer prepared by reaction of an excess of an aromatic diisocyanate with a low molecular weight diol such as, for example, dipropylene glycol and/or tripropylene glycol. The blowing agent may be an inert physical blowing agent such as, for example, trichlorofluoromethane or, alternatively, a reactive agent such as, for example, water. The preparation of polyurethane elastomer by such procedures is described in, for example, patent publications E.P. 235,888; E.P. 175,733; U.S. Pat. No. 3,591,532; U.S. Pat. No. 3,901,959; U.S. Pat. No. 4,647,596 and U.S. Pat. No. 4,757,095.

Current manufacturing trends for polyurethane elastomers are driven by two dominant factors, namely, cost and environmental concern. Consideration of cost stimulates polyurethane elastomer producers to select polyether polyols over polyester polyols; consideration of environmental concerns stimulates polyurethane elastomer producers to select, when required, water in preference to certain physical blowing agents. Selection of polyether polyols can have a negative implication for physical properties of the resulting elastomer, including abrasion resistance. Similarly, use of water as blowing agent can also have a negative implication for physical properties of the resulting elastomer, including abrasion resistance and low temperature durability. Some of these deficiencies, notably low temperature durability, can be reduced by use of an isocyanate-terminated prepolymer prepared by reaction of an excess of an aromatic diisocyanate with a high molecular weight polyether diol or triol. However, there still remains the need to find a general means of enhancing the abrasion resistance of a polyurethane elastomer, optionally prepared in the presence of a blowing agent and particularly water.

Our investigations into the preparation of polyurethane elastomer has now revealed that selected liquid polybutadienes can significantly enhance the abrasion resistance of a polyurethane elastomer when prepared in the presence thereof. Such observation was unexpected in consideration of the open literature documenting the use of liquid polybutadienes when preparing a polyurethane elastomer. U.S. Pat. No. 4,242,468 discloses the use of a monohydroxylated polybutadiene, in amounts of at least 30 parts per 100 parts by weight of polyol, as a nonmigratory plasticizer in polyurethanes, the document is silent with respect to abrasion resistance. Plasticizers serve to soften material and it is generally appreciated that softer material has an inferior abrasion resistance. Pat. No. 5,079,270 discloses the preparation of polyurethane articles in the presence of a liquid polybutadiene having a molecular weight of from 1500 to 6000 wherein the polybutadiene serves as an internal mold release agent; the document is silent with respect to abrasion resistance.

SUMMARY OF THE INVENTION

In a first aspect, this invention relates to a polyurethane elastomer prepared by reacting:

(a) a urethane-modified polyisocyanate, with (b) at least one polyether polyol or polyester polyol, in the presence of (c) from about 0.1 to about 10 parts per 100 parts by weight of (b) of a liquid polybutadiene comprising 1,2-butene, 2,3-(trans)butene and 2,3-(cis)butene moieties wherein the 1,2-butene content is less than about 50 percent, based on total butene content and the 2,3 (cis)-butene content is greater than the 2,3-(trans)butene content, with said elastomer being characterized in having (i) a density of from about 100 to about 1100 kg/m$^3$, and (ii) an abrasion loss of less than about 300 mg, as determined in accordance with Test Method A of ISO 4649.

In a second aspect, this invention relates to a polyurethane elastomer prepared by reacting:

(a) a urethane-modified polyisocyanate which has an isocyanate content of from about 15 to about 30 weight percent and obtained by reacting a methylene diphenylisocyanate with a polyol, with (b) at least one polyester polyol or polyether polyol which is a diol or a triol having an average hydroxyl equivalent weight of from about 500 to about 5000, in the presence of (c) from about 0.1 to about 10 parts per 100 parts by weight of (b) of, a liquid polybutadiene comprising 1,2-butene, 2,3-(trans)butene and 2,3-(cis)butene moieties and having a molecular weight of from about 1000 to about 10000, wherein the 1,2-butene content is less than about 35 percent, and the 2,3 (cis)butene content is at least 60 percent, both percentages based on total butene content.

said elastomer being characterized in having (i) a density of from about 100 to about 1100 kg/m$^3$, and (ii) an abrasion loss of less than about 300 mg, as determined in accordance with Test Method A of ISO 4649.

In a third aspect, this invention relates to a method for improving the abrasion resistance of a polyurethane elastomer which comprises reacting a urethane-modified polyisocyanate with at least one polyether polyol or polyester polyol in the presence of a liquid polybutadiene, wherein:

(a) the polybutadiene is present in an amount of from about 0.1 to about 10 parts per 100 parts by weight of polyol, and comprises 1,2-butene, 2,3-(trans)butene and 2,3-(cis)butene moieties the 1,2-butene content being less than about 50 percent based on total butene content and the 2,3 (cis)-butene content is greater than the 2,3-(trans)butene content; and (b) the polyisocyanate is present in an amount sufficient to provide an isocyanate reaction index of from about 80 to about 120.

In a fourth aspect, this invention relates to an isocyanate-reactive composition for use in the manufacture of a polyurethane elastomer as above mentioned which, based on total amounts by weight of (a) and (b), comprises:

(a) from about 90 to about 99.9 weight percent of a polyether polyol, or polyester polyol, having an average of from about 2 to 4 hydroxyl groups per molecule and an average hydroxyl equivalent weight of from about 500 to about 5000; and (b) from about 0.1 to about 10 weight percent, of a liquid polybutadiene comprising 1,2-butene, 2,3-(trans- )butene and 2,3-(cis)butene moieties, bwherein the 1,2-butene content is less than about 50 percent, based on total butene content and the 2,3 (cis)-butene content is greater than the 2,3-(trans)butene content.

Specific Embodiments of the Invention

The polyurethane elastomer disclosed herein can be characterized in that it has a density of from about 100 to about 1100, preferably from about 200 to about 1000, and more preferably from about 300 to about 800 kg/m$^3$. The elastomer can be further characterized in that it exhibits an improved abrasion resistance. The abrasion resistance performance of the elastomer being observed as a material loss of less than about 300, preferably less than about 250, and more preferably less than about 200, and yet more preferably less than about 150 mg, as determined in accordance with Test Method A of ISO 4649.

The polyurethane elastomer is prepared by reacting a urethane-modified polyisocyanate with a polyester polyol or polyether polyol in the presence of a polybutadiene, which is a liquid at room temperature (25° C.). Applicants have found that the use of a selected polybutadiene is important for the obtention of a product that can exhibit the improved abrasion resistance performance. Polybutadiene, prepared by polymerization of butadiene, in general can be characterized in that it is constituted by structural moieties that can be described as being equivalent to 1,2-butene, and 2,3-butene in both the cis- and transconfiguration. FIG. 1 depicts schematically these moieties in the part of a polybutadiene polymer chain: the cis-2,3-butene moiety is represented by part A; the 1,2-butene moiety by part B; and the trans-2,3-butene moiety by part C.

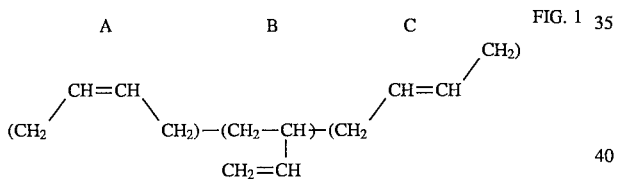

FIG. 1

To provide the polyurethane elastomer with improved abrasion resistance performance, it has been found that the 1,2-butene content of the polybutadiene should be less than about 50, preferably less than about 35, and more preferably less than about 25, and yet more preferably less than about 15 weight percent of the total A, B and C content. For the same purpose, it is found advantageous to employ a polybutadiene which contains a greater proportion of cis-2,3-butene moieties than trans-2,3-butene moieties. The cis-2,3-butene content of the polybutadiene advantageously is at least 50, preferably at least 60, and more preferably at least 70 percent of the total A, B, and C content.

To facilitate mixing with the polyisocyanate and polyol reactants as used to prepare the polyurethane, the viscosity of the liquid polybutadiene advantageously does not exceed about 50000, and preferably does not exceed about 20000, and more preferably does not exceed about 15000 mPa.s at 25° C. Typically a polybutadiene with a number average molecular weight of up to about 10000, preferably from about 1000 to about 10000, and more preferably from about 1500 to about 8000, and yet more preferably from about 3000 to about 8000 is suitable for use in the present invention. If polybutadiene as available has a high 1,2-butene content, it is of advantage for the said polybutadiene to have a high molecular weight.

In a preferred embodiment of this invention, the polybutadiene has a 1,2-butene content of less than about 25 percent, and has a cis-2,3-butene content of at least 60 percent of the total A, B, and C content. Optionally, and to enhance the compatibility of the liquid polybutadiene with polyol, a hydroxylated polybutadiene can be used. Such a hydroxylated polybutadiene typically will have a hydroxyl number of less than about 40, preferably less than about 25, and more preferably less than about 15; and normally will have a hydroxyl functionality of less than 2, preferably less than about 1.5 hydroxyl units/polybutadiene molecule.

The techniques for preparing such liquid polybutadienes are well documented in the open literature and will not be further reported herein. However, it is to be appreciated that the A, B, and C butene contents of the polybutadiene can be influenced by the polymerization catalyst and polymerization conditions employed. Exemplary of commercially available polybutadienes suitable for use in the present invention are given in Table 1, along with what is appreciated to be their general characteristics.

TABLE 1

| Product | Supplier | Molecular weight | Viscosity (centipoise at 25° C.) | 1,2-butene content | Total 2,3-butene content (cis-content) |
|---|---|---|---|---|---|
| POLYOL 110 | Hüls (De) | 1800 | 860 | 1 | 99 (72) |
| POLYOL 130 | Hüls (De) | 3000 | 3300 | 1 | 99 (75) |
| LITHENE N4-5000 | Revertex (UK) | 5000 | 4000 | 20 | 80 (/) |
| LITHENE N4-9000 | Revertex (UK) | 8000 | 14000 | 13 | 87 (/) |
| LITHENE HFN4-9000[1] | Revertex (UK) | 5000 | 3500 | 20 | 80 (/) |
| RICON 154[2] | Ricon (USA) | 2800 | 8090000 | 90 | 10 |

[1] Understood to be a monohydroxylated polybutadiene, OH Number of about 7.
[2] A comparative liquid polybutadiene for the purpose of this invention due to its 1,2-butene content.

In preparing the elastomer of this invention the liquid polybutadiene is used in an amount of from about 0.1, preferably from about 0.5, more preferably from about 1, and yet more preferably from about 2.5; and up to about 10, preferably up to about 5 parts per 100 parts by weight of polyol.

The polyisocyanate component used to prepare the elastomer of this invention is a urethane-modified polyisocyanate, and especially a urethane-modified aromatic polyisocyanate. The isocyanate content of the urethane-modified polyisocyanate advantageously is from about 15 to about 30 weight percent. When the elastomer to be produced is intended, for example, for a shoe sole application, it is advantageous to use a urethane-modified polyisocyanate having an isocyanate content of from about 17 to about 24 weight percent. When the elastomer to be produced is intended, for example, for a semirigid integral skin application, it is advantageous to use a urethane-modified polyisocyanate having an isocyanate content of more than 25 and up to 30, preferably from about 27 to about 30, weight percent. Use of a non modified polyisocyanate in combination with the liquid polybutadiene has, to date, not been found to provide for the improved abrasion resistance of polyurethane elastomer.

The preferred urethane-modified aromatic polyisocyanates are those obtained by reacting an excess of a methylene diphenylisocyanate with a polyol which is a polyester or preferably a polyether polyol and notably a diol or triol. Applicants have found that methylene diphenylisocyanate modified by reaction with low molecular weight glycol or high molecular weight polyol are equally suitable for this invention. By the term "high molecular weight" it is meant polyols having a molecular weight of 1000 or more. The techniques for preparing such urethane-modified polyisocyanates are well documented in the open literature and will not be further reported herein.

In preparing the elastomer of this invention, the urethane-modified polyisocyanate is used in an amount to provide for an isocyanate reaction index of advantageously from about 80 to about 120, preferably from about 90 to about 110, and more preferably from about 95 to about 105. By the term "isocyanate index" it is understood that at an index of 100, that one equivalent of isocyanate is present for each isocyanate reactive hydrogen atom present from the polyol, or other active hydrogen atom bearing substance able to react with the urethane-modified polyisocyanate.

The polyol component suitable for use in preparing the elastomer of this invention is a polyester polyol, preferably a polyether polyol which has an average of from about 2 to about 4, preferably from about 2 to about 3, and more preferably from about 2 to about 2.5 hydroxyl groups/ molecule; and an average hydroxyl equivalent weight of from about 500 to about 5000, preferably from about 1000 to about 3500, and more preferably from about 1500 to about 3000. Optionally and advantageously, such polyether polyol may also have a primary hydroxyl content of from at least 75, preferably from at least 80, and more preferably from at least 85 percent based on total hydroxyl content of the polyol. Typically, such polyether polyols may be obtained by reaction of an active hydrogen-containing initiator with a quantity of one or more alkylene oxides to give a product of desired hydroxyl nature and equivalent weight. Generally, such alkylene oxides are $C_{2-4}$ alkylene oxides and include 1,4-butylene oxide, 2,3-butylene oxide, and especially propylene oxide and ethylene oxide. Exemplary of suitable active hydrogen-containing initiators are polyols, polyether adducts of polyols, polyamines and other compounds having a plurality of active hydrogen atoms per molecule, such as those described in U.S. Pat. No. 4,500, 422. Preferred initiators for use in preparing polyether polyols suitable for employment in the process of preparing the polyurethane elastomer include ethylene glycol, propylene glycol, butylene glycol, glycerine, 1,1,1-trimethylolpropane, 1,1,1-trimethylolethane, α-methylglucoside, $C_{2-8}$ alkylene diamines such as, for example, ethylenediamine and hexamethylenediamine, and mixtures thereof. Especially preferred are the glycol initiators or alkoxylated adducts of such glycols.

Exemplary of commercially available and preferred polyether polyols for use in manufacturing a polyurethane elastomer by the process of this invention are those polyether polyols identified by the trademark "VORANOL" and include products designated as VORANOL EP 1900 and VORANOL CP 6055, sold by The Dow Chemical Company.

In addition to the polyols described hereinabove other suitable polyols which may be present in the process of preparing the polyurethane elastomer include the so-called polymer polyols based on polyether polyols such as those described in U.S. Pat. No. 4,394,491. Among the useful polymer polyols are included dispersions of vinyl polymers, particularly styrene/acrylonitrile copolymers, in a continuous polyether polyol phase. Also useful are the so-called polyisocyanate polyaddition (PIPA) polyols (dispersions of polyurea-polyurethane particles in a polyol) and the polyurea dispersions in polyol such as, for example, PHD polyols. Copolymer polyols of the vinyl type are described in, for example, U.S. Pat. Nos. 4,390,645; 4,463,107; 4,148, 840 and 4,574,137.

Suitable polyester polyols may, for instance, be produced from dicarboxylic acids, preferably aliphatic dicarboxylic acids, having 2 to 12 carbon atoms in the alkylene radical, and multifunctional alcohols, preferably diols. These acids include, for instance, aliphatic dicarboxylic acids such as glutaric acid, pimelic acid, suberic acid, azelaic acid, sebacic acid, undecanedioic acid, dodecanedioic acid, and preferably, succinic and adipic acids; cycloaliphatic dicarboxylic acids such as 1,3- and 1,4-cyclohexane dicarboxylic acid, and aromatic dicarboxylic acids such as phthalic acid and terephthalic acid. Examples of di- and multifunctional, particularly difunctional, alcohols are: ethylene glycol, diethylene glycol, propylene glycol, dipropylene glycol, 1,3-propanediol, 1,10-decanediol, glycerine, trimethylolpropane, and preferably, 1,4-butanediol, and 1,6-hexanediol.

When preparing a polyurethane elastomer as disclosed herein, optionally and advantageously the polyether or polyester polyol is used in admixture with a chain extending agent. The presence of a chain extending agent provides desirable physical properties, especially hardness, of the resulting elastomer. Typically polyurethane elastomers prepared according to this invention, in the presence of a chain extending agent, will have a Shore A Hardness of from about 20A to about 80A, preferably from 35A to about 75A, and more preferably from about 45A to about 70A. To provide elastomers with such hardness, the chain-extending agent advantageously is used in an amount of from about 2 to about 20, preferably from about 5 to about 15, and more preferably from about 6 to about 12 percent based on total weight of the polyether polyol and chain extending agent.

The chain-extending agent is characterized in that it is an isocyanate-reactive substance, especially an organic difunctional isocyanate-reactive substance that has an equivalent weight of less than or equal to 150 and preferably less than or equal to 100. Representative of suitable chain-extending agents include polyhydric alcohols, aliphatic diamines including polyoxyalkylene diamines, aromatic diamines and mixtures thereof. Preferred chain extending agents are dihydroxyl compounds, especially glycols. Illustrative of suitable chain-extending agents include 1,2-ethanediol, 1,3-propanediol, 1,5-pentanediol, 1,6-hexanediol, 1,2-propanediol, 1,3-butanediol, 1,4-butanediol, 1,6-hexanediol, 1,4-cyclohexanediol, 1,4-cyclohexanedimethanol, ethylenediamine 1,4-butylenediamine and 1,6-hexamethylenediamine. Compounds such as ethoxylated hydroquinone can also be employed as a chain-extending agent. The above-mentioned chain extending agents can be used singularly or combined or in admixture with other compounds including diethylene glycol, dipropylene glycol, tripropylene glycol, ethanolamine, diethanolamine, triethanolamine and N-methyldiethanolamine, and N-ethyldiethanolamine, as well as adducts obtained by esterification of aliphatic carboxylic acids with aliphatic diols or trio is such as those exemplified above utilizing from 0.01 to 1.08 mole of acid per mole of diol/triol. While any of the chain extending agents exemplified above can be employed in the process of preparing the polyurethane elastomer, it is particularly preferred to use 1,4-butanediol, 1,6-hexanediol, neopentyl glycol, 1,4-cyclohexane diol, ethylene glycol, bishydroxyethoxybenzene, ethoxylated hydroquinone glycerine, and diethylene glycol either alone or in admixture. Especially preferred as chain-extending agent is 1,4-butanediol.

As mentioned hereinabove, the polyurethane elastomer is optionally prepared in the presence of a blowing agent which comprises carbon dioxide, an aliphatic or alicyclic $C_3$–$C_8$ alkane, or a chlorine-free halogenated alkane, or mixtures thereof. Carbon dioxide may be used in a gaseous or liquid form, or generated insitu by the presence of water which reacts with the polyisocyanate to provide the carbon dioxide. The amount of water present is typically from about 0.05 to about 2, preferably from about 0.1 to about 1.5 and more preferably from about 0.2 to about 1 weight percent, based on the total weight of the polyol and optional chain-extending agent present. Exemplary of suitable aliphatic or alicyclic C3–C8 alkanes include butane, n-pentane, i-pentane, hexane, cyclopentane and cyclohexane. Exemplary of suitable chlorine-free halogenated alkanes include di-, tri-, and tetrafluoroethane.

When preparing the polyurethane elastomer, optionally but advantageously present are additional additives including catalysts, surfactants, fillers, pigments, fire retardants, antioxidants, and antistatic agents. The use of such additives is well-known in the art and reference is made thereto for this purpose.

Suitable catalysts include the tertiary amine and organometallic compounds such as those described in U.S. Pat. No. 4,495,081. When using an amine catalyst advantageously it is present in an amount of from about 0.1 to about 3, preferably from about 0.1 to about 1.5 and more preferably from about 0.3 to about 1 weight percent by total weight of polyol and optional chain extending agent. When the catalyst is an organometallic catalyst, advantageously it is present in an amount of from about 0,001 to about 0.2, preferably from about 0.002 to about 0.1 and more preferably from about 0.01 to about 0.05 weight percent by total weight of polyol and optional chain extending agent. Particularly useful catalysts include triethylenediamine, bis(N, N-dimethylaminoethyl)ether and di(N,N-dimethylaminoethyl)amine, dialkyl tindicarboxylate substances including dimethyltin dilaurate, dibutyltin dilaurate, dioctyltin dilaurate, dibutyltin diacetate; and stannous octoate. Combinations of amine and organometallic catalysts advantageously may be employed.

Suitable surfactants include the diverse silicone surfactants, preferably those which are block copolymers of a polysiloxane and a polyoxyalkylene. Exemplary of such surfactants are the products DC-193 and Q4-3667 available from Dow Corning and TEGOSTAB B4113 available from Goldschmidt. When present, the amount of surfactants advantageously employed is from about 0.1 to about 2, and preferably from about 0.2 to about 1.3 percent by total weight of the polyol and optional chain extending agent. Other suitable surfactants also include non-silicone containing surfactants, such as poly(alkyleneoxides).

Suitable pigments and fillers include for example calcium carbonate, graphite, carbon black, titanium dioxide, iron oxide, alumina trihydrate, wollastonite, prepared glass fibers dropped or continuous, polyesters and other polymeric fibers.

Suitable methods of intimately mixing the urethane-modified polyisocyanate with the polyol include molding techniques such as described in, for example, "Polyurethanes Handbook" by Günter Oertel Hanser Publishes Munich ISBN 0-02-948920-2 (1985). Other suitable methods for preparing microcellular and elastomeric polyurethane polymers are described, for example, in U.S. Pat. Nos. 4,297,444; 4,218,543; 4,444,910; 4,530,941 and 4,269,945.

The polyurethane elastomer disclosed herein is preferably a microcellular polyurethane elastomer. Such a elastomer is typically prepared by intimately mixing the reaction components at room temperature or a slightly elevated temperature for a short period and then pouring the resulting mixture into an open mold, or injecting the resulting mixture into a closed mold, which in either case is heated. Upon completion of the reaction, the mixture takes the shape of the mold to produce a polyurethane elastomer of a predefined structure, which can then be sufficiently cured and removed from the mold with a minimum risk of incurring deformation greater than that permitted for its intended end application. Suitable conditions for promoting the curing of the elastomer include a mold temperature of typically from about 20° C. to about 150° C., preferably from about 35° C. to about 75° C., and more preferably from about 45° C. to about 55° C. Such temperatures generally permit the sufficiently cured elastomer to be removed from the mold typically in about 1 to 10 minutes and more typically in about 1 to 5 minutes after intimately mixing the reactants. Optimum cure conditions will depend on the particular components including catalysts and quantities used in preparing the elastomer and also the size and shape of the article manufactured.

The polyurethane elastomer disclosed herein is useful in the preparation of articles such as, for example, carpet, rollers, door seals, coatings, tires, wiper blades, steering wheels, gaskets, belts, and particularly shoe soles.

The following examples are provided to illustrate the invention but are not intended to limit the scope thereof. All parts and percentages are given by weight unless otherwise indicated.

The reactants and the components present when preparing the polyurethane elastomers are identified as follows:

Polyol 1 - a poly(oxypropylene-oxyethylene) diol having a hydroxyl equivalent weight of 2000 and a primary hydroxyl content of at least 85%.

Polyol 2 - a 2000 equivalent weight poly(oxypropyleneoxyethylene) triol having a primary hydroxyl content of at least 75%.

TEDA - triethylenediamine
DBTDL - dibutyltin dilaurate
Polybutadiene A - Polyol 110, as described in Table 1.
Polybutadiene B - Polyol 130, as described in Table 1.
Polybutadiene C - LITHENE N4-5000, as described in Table 1.
Polybutadiene D - LITHENE N4-9000, as described in Table 1.
Isocyanate 1 - a urethane-modified polyisocyanate having an isocyanate content of 18 wt% obtained by reacting an excess of 4,4'-methylene diphenylisocyanate with a polyol mixture having an average equivalent weight of about 1000 and comprising Polyol 2 and a 1000 molecular weight polyoxypropylene glycol.
Isocyanate 2 - a urethane-modified polyisocyanate having an isocyanate content of 18.5 wt % obtained by reacting an excess of 4,4'-methylene diphenylisocyanate with a polyol mixture having an average equivalent weight of about 1770 and comprising Polyol 1, Polyol 2 and dipropylene glycol.
Isocyanate 3 - a urethane-modified polyisocyanate having an isocyanate content of 23.2 wt % obtained by reacting an excess of 4,4'-methylene diphenylisocyanate with dipropylene glycol.

EXAMPLE 1

Elastomers 1 to 4 are prepared according to the formulation given in Table 2 employing a low pressure mixer dispensing unit and a mold with dimensions of 200×200×6 mm thermostated to a temperature of from 45° to 55° C. Elastomers 5 to 11 are prepared in a similar manner only in this case the mold has as dimensions 200×200×10 mm. The physical properties, as observed, of the resulting elastomers are also reported in Table 2.

Examples 1 to 4 illustrate the abrasion resistance improvement of polyurethane elastomers obtained by use of a greater amount of a liquid polybutadiene. Examples 5 to 9 illustrate the abrasion resistance improvement of a water-blown polyurethane elastomer obtained by use of the same amount of a liquid polybutadiene having a different molecular weight. Use of a higher molecular weight polybutadiene favouring a better abrasion resistance. Example 10 and 11 illustrate the dramatic improvement of abrasion resistance of a water-blown polyurethane elastomer prepared from an alternative isocyanate and in the presence a liquid polybutadiene.

Examples 1, 5 and 10 do not contain a polybutadiene and are not an example of this invention.

EXAMPLE 2 (Comparative Example)

An elastomer, Elastomer 12, is prepared according to the procedure as described for Elastomer 7 of Example 1 except that the 3.5 pbw of Polybutadiene B is substituted by 3.5 pbw of Polybutadiene E. Polybutadiene E being the product RICON 154 as disclosed in Table 1 of the description.

The abrasion resistance of the Elastomer 12 is observed as being a weight loss of about 340 mg, compared to 140 mg of Elastomer 7. Both polybutadienes have a similar molecular weight, but Polybutadiene E has a significantly higher 1,2-butene content which is believed to lead to the inferior abrasion resistance.

TABLE 2

| (pbw) | Elastomer | | | | | | | | | | |
|---|---|---|---|---|---|---|---|---|---|---|---|
| | 1* | 2 | 3 | 4 | 5* | 6 | 7 | 8 | 9 | 10* | 11 |
| Polyol 1 | 65.1 | 64.4 | 63.0 | 61.6 | 77 | 73.4 | 73.4 | 73.4 | 73.4 | 77 | 73.4 |
| Polyol 2 | 27.9 | 27.6 | 27.0 | 26.4 | 12.3 | 11.8 | 11.8 | 11.8 | 11.8 | 12.3 | 11.8 |
| 1,4-butanediol | 6.3 | 6.3 | 6.3 | 6.3 | 9.6 | 9.6 | 9.6 | 9.6 | 9.6 | 9.6 | 9.6 |
| TEDA | 0.7 | 0.7 | 0.7 | 0.7 | 0.7 | 0.7 | 0.7 | 0.7 | 0.7 | 0.7 | 0.7 |
| DBTDL | 0.02 | 0.02 | 0.02 | 0.02 | 0.02 | 0.02 | 0.02 | 0.02 | 0.02 | 0.02 | 0.02 |
| Water | — | — | — | — | 0.45 | 0.45 | 0.45 | 0.45 | 0.45 | 0.45 | 0.45 |
| Polybutadiene A | — | — | — | — | — | 3.5 | — | — | — | — | 3.5 |
| Polybutadiene B | — | 1 | 3 | 5 | — | — | 3.5 | — | — | — | — |
| Polybutadiene C | — | — | — | — | — | — | — | 3.5 | — | — | — |
| Polybutadiene D | — | — | — | — | — | — | — | — | 3.5 | — | — |
| Isocyanate 1 | 43 | 42 | 42 | 42 | — | — | — | — | — | — | — |
| Isocyanate 2 | — | — | — | — | 67 | 67 | 67 | 67 | 67 | — | — |
| Isocyanate 3 | — | — | — | — | — | — | — | — | — | 53 | 53 |
| Density (kg/m$^3$) | 1000 | 1000 | 1000 | 1000 | 600 | 600 | 600 | 600 | 600 | 600 | 600 |
| Shore A Hardness according to ISO 868 | 58 | 57 | 56 | 56 | 53 | 52 | 52 | 52 | 52 | 54 | 54 |
| Abrasion loss (mg) according to ISO 4649, Method A | 265 | 240 | 175 | 85 | 840 | 270 | 140 | 130 | 85 | 555 | 81 |
| Tensile Strength (N/mm$^2$) according to ISO 37 | 7.5 | 6.5 | 7.5 | 7.5 | 4.5 | 4.0 | 4.0 | 4.0 | 4.0 | 4.8 | 4.7 |
| Elongation at break (%) according to ISO 37 | 640 | 550 | 660 | 580 | 500 | 450 | 450 | 450 | 450 | 370 | 375 |
| Tear Strength (N/mm) according to ISO 34, Method A | 9.3 | 9.2 | 9.1 | 9 | 7.4 | 7.0 | 7.0 | 7.0 | 7.0 | 7.51 | 6.92 |
| Flex. fatigue resistance at −20 C. according to BS 5131, 2.1 (× 1000 bendings to failure) | 150 | 150 | 150 | 150 | 100 | 100 | 100 | 100 | 100 | <10 | <10 |

What is claimed is:

1. A polyurethane elastomer prepared by reacting:

(a) a urethane-modified polyisocyanate, with (b) at least one polyether polyol or polyester polyol, in the presence of (c) from about 0.1 to about 10 parts per 100 parts by weight of (b) of a liquid polybutadiene comprising 1,2-butene, 2,3-(trans)butene and 2,3-(cis)butene moieties wherein the 1,2-butene content of less than about 50 percent, based on total butene content and the 2,3 (cis)-butene content is greater than the 2,3-(trans)butene content, with said elastomer being characterized in having (i) a density of from about 100 to about 1100 kg/m$^3$, and (ii) an abrasion loss of less than about 300 mg, as determined in accordance with Test Method A of ISO 4649.

2. The elastomer of claim 1 wherein the polyisocyanate has an isocyanate content of from about 15 to about 30 weight percent and obtained by reacting a methylene diphenylisocyanate with a polyol. (To be consistent with the description on page 3, lines 31–33.)

3. The elastomer of claim 2 wherein the polyisocyanate has an isocyanate content of from about to about 25 weight percent.

4. The elastomer of claim 2 wherein the polyisocyanate has an isocyanate content of more than 25 and up to 30 weight percent.

5. The elastomer of claim 1 wherein the polyether or polyester polyol is a diol or triol having an average hydroxyl equivalent weight of from about 500 to about 5000.

6. The elastomer of claim 5 wherein the polyol is a polyether polyol which has an average hydroxyl equivalent weight of from about 1000 to about 3500.

7. The elastomer of claim 1 wherein the polybutadiene has a 1,2-butene content of less than about 35 percent, based on total butene content.

8. The elastomer of claim 7 wherein the polybutadiene has a 1,2-butene content of less than about 25 percent, and contains at least 50 percent of 2,3 (cis)-butene moieties, based on total butene content.

9. The elastomer of claim 1 wherein the polybutadiene has a number average molecular weight of from about 1000 to about 10000.

10. The elastomer of claim 8 wherein the polybutadiene is a hydroxylated polybutadiene.

11. The elastomer of claim 1 prepared in the presence of a blowing agent which comprises carbon dioxide, an aliphatic or alicyclic $C_3$–$C_8$ alkane, or a chlorine-free halogenated alkane.

12. The elastomer of claim 11 wherein the blowing agent is present in an amount sufficient to provide the resulting polyurethane elastomer with a density of from about 200 to about 1000 kg/m$^3$.

13. The elastomer of claim 12 wherein the blowing agent consists essentially of carbon dioxide provided by the presence of water reacting with the polyisocyanate.

14. A polyurethane elastomer prepared by reacting:

(a) a urethane-modified polyisocyanate which has an isocyanate content of from about 15 to about 30 weight percent and obtained by reacting a methylene diphenylisocyanate with a polyol, with (b) at least one polyester or polyether polyol, which is a diol or triol having an average hydroxyl equivalent weight of from about 500 to about 5000, in the presence of (c) from about 0.1 to about 10 parts per 100 parts by weight of (b) of a liquid polybutadiene comprising 1,2-butene, 2,3-(trans)butene and 2,3-(cis)butene moieties and having a molecular weight of from about 1000 to about 10000 wherein the a 1,2-butene content is less than about 35 percent, and the 2,3 (cis)-butene content is at least 60 percent, both percentages based on total butene content.

said elastomer being characterized in having (i) a density of from about 100 to about 1100 kg/m$^3$, and (ii) an abrasion loss of less than about 300 mg, as determined in accordance with Test Method A of ISO 4649.

15. The elastomer of claim 14 prepared in the presence of a blowing agent which comprises water, an aliphatic or alicyclic $C_3$–$C_8$ alkane, or a chlorine-free halogenated alkane.

16. The elastomer of claim 15 wherein the blowing agent consists solely of water present in an amount sufficient to provide the elastomer with a density of from about 300 to about 800 kg/m$^3$.

17. The elastomer of claim 16 being prepared in the presence of from about 0.5 to about 5 of a polybutadiene which has a number average molecular weight of from about 3000 to about 8000 and characterized in having an abrasion loss of less than 200 mg, as determined in accordance with Test Method A of ISO 4649.

18. A method for improving the abrasion resistance of a polyurethane elastomer which comprises reacting a urethane-modified polyisocyanate with at least one polyether polyol or polyester polyol in the presence of a liquid polybutadiene, wherein:

(a) the polybutadiene is present in an amount of from about 0.1 to about 10 parts per 100 parts by weight of polyol, and comprises 1,2-butene, 2,3-(trans)butene and 2,3-(cis)butene moieties the 1,2-butene content being less than about 50 percent based on total butene content and the 2,3 (cis)-butene content is greater than the 2,3-(trans)butene content; and (b) the polyisocyanate is present in an amount sufficient to provide an isocyanate reaction index of from about 80 to about 120.

19. The method of claim 18 wherein the polyisocyanate has an isocyanate content of more than 25 and up to 30 weight percent.

20. An isocyanate-reactive composition for use in the manufacture of a polyurethane elastomer, according to claim 1, which, based on total amounts by weight of (a) and (b), comprises:

a) from about 90 to about 99.9 weight percent of a polyester or polyether polyol having an average of from about 2 to 4 hydroxyl groups per molecule and an average hydroxyl equivalent weight of from about 500 to about 5000; and b) from about 0.1 to about 10 weight percent of a liquid polybutadiene comprising 1,2-butene, 2,3-(trans)butene and 2,3-(cis)butene moieties, wherein the 1,2-butene content is less than about 50 percent, based on total butene content and the 2,3 (cis)-butene content is greater than the 2,3-(trans)butene content.

\* \* \* \* \*